A. C. SINCARE.
PIVOTED STEERING WHEEL.
APPLICATION FILED JAN. 5, 1918.

1,268,506.

Patented June 4, 1918.

Inventor.
Antonio C. Sincare

UNITED STATES PATENT OFFICE.

ANTONIO C. SINCARE, OF WINTHROP, MASSACHUSETTS.

PIVOTED STEERING-WHEEL.

1,268,506.  Specification of Letters Patent.  Patented June 4, 1918.

Application filed January 5, 1918. Serial No. 210,421.

*To all whom it may concern:*

Be it known that I, ANTONIO C. SINCARE, a citizen of the United States, residing at Winthrop, in the county of Suffolk and State of Massachusetts, have invented new and useful Improvements in Pivoted Steering-Wheels, of which the following is a specification.

This invention relates to improvements in steering wheels for motor vehicles and has for its object to provide a steering wheel which is very neat in appearance, simple in construction but exceedingly strong and durable and capable of being folded against the steering post in such a position as to occupy the least amount of space possible, thereby providing ample space for the operator in getting into and out of the operative position of the vehicle and at the same time providing a substantial support to enable the operator to lift himself from the operator's seat when leaving the same and to assist him in getting into said seat.

The invention consists in the combination and arrangement of parts set forth in the following specification and particularly pointed out in the claims.

Referring to the drawings.

Like numerals refer to like parts in both views of the drawings.

Figure 1:
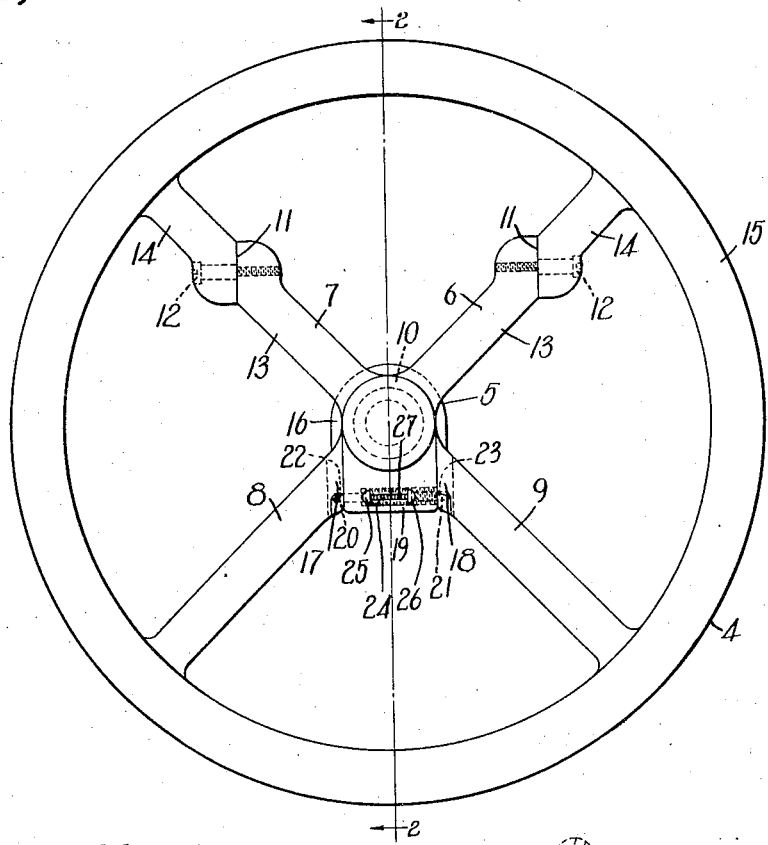
Figure 1 is a plan view of a steering wheel embodying my invention.

In the drawings, 1 is the steering post embodying in its construction a shaft 2 which is rotatably arranged within a tube 3, said shaft extending from the steering mechanism, not shown, upwardly through said tube to the upper end thereof and secured to said upper end is the steering wheel 4.

The particular novelty of the steering wheel embodying this invention lies in the manner in which the rim, which is preferably an unbroken or continuous rim, is mounted upon the steering post. In carrying out this feature of the invention, a spider 5 is provided, consisting preferably of four spokes 6, 7, 8 and 9. Two of these spokes, that is, the spokes 6 and 7, are formed integral with a collar 10 secured to the upper end of the shaft 2. The spokes 6 and 7 are furthermore formed in two parts 13 and 14 which are pivotally united or jointed at 11, 11 respectively. The contacting surfaces of said jointed members preferably lie in parallel planes.

The two parts 13 and 14 of each of said spokes 6 and 7 are pivotally connected together by screws 12, 12 respectively arranged with the median axial lines thereof coinciding, and this median axial line is disposed at a substantial distance to one side of and at right angles to the axis of the shaft 2 and at a distance below the central plane of rotation of the rim 15.

The other two spokes 8 and 9 of the spider 5 do not conform in construction with the spokes 6 and 7 and these spokes are joined together, at their inner ends, by a curved member 16 which is adapted to encircle a portion of the upper end of the tube 3 in close proximity to the collar 10.

The portions of the curved member 16 where said member unites with the spokes 8 and 9 are disposed in substantially parallel relation, indicated at 17 and 18, and projecting from the collar 10 between said parallel sections 17 and 18, at least when the rim 15 is in its normal operative position, is an enlargement 19.

To maintain the rim 15 in its operative position with respect to the steering post 1, means are provided preferably consisting of latches 20 and 21 oppositely disposed and mounted in the enlargement 19 to protrude from opposite faces of said enlargement into engagement with suitably shaped recesses 22 and 23 formed respectively in the parallel portions 17 and 18 of said spokes, said latches being operated in opposite directions by means of a spring 24 disposed within a recess 29 in said enlargement.

Figure 2:
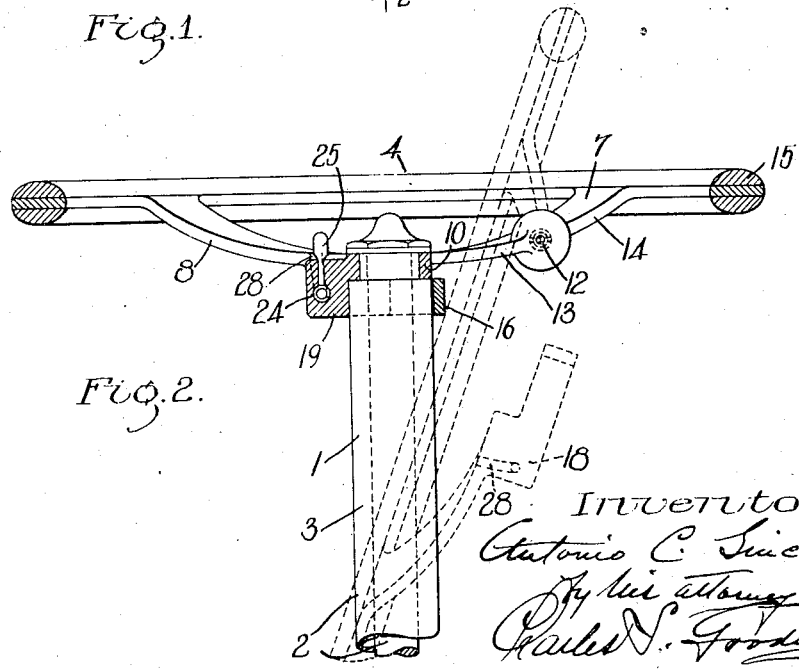
Fig. 2 is a section taken on the line 2—2 of Fig. 1, illustrating the wheel rim in full lines in its operative position and in dotted lines in its folded position.

Finger pieces 25 and 26 are connected respectively with the latches 20 and 21 and protrude through a slot 27 to provide for the manual operation of said latches when it is desired to unlock or release the spokes 8 and 9 from the enlargement 19. To move the rim 15 from its operative position, as shown in full lines, Fig. 2, to the inoperative position thereof, illustrated by the dotted lines in said figure, the finger pieces 25 and 26 must be drawn together against the action of the spring 24 and said latches 20 and 21 will thereby be withdrawn from their recesses 22 and 23 in the spokes 8 and 9, permitting the rear portion of said rim to be depressed and the forward or that portion beyond the axis of the pivots of said spokes 6 and 7 to move upwardly, said latter portion serving as a support for the operator when getting into and out of the seat of the vehicle, the lower portion of said rim being at this time in contact with the under side of the tube 3.

After the operator has regained his seat, the rim 4 may be moved upwardly by grasping the lower portion thereof and the latches 20 and 21 will be forced inwardly by beveled faces 28 formed upon the inner portions of the spokes 8 and 9 adjacent to the recesses 22 and 23 and when said rim has been moved until the curved member 16 engages the tube 3 and further upward movement of said rim prevented, said latches 20 and 21 will automatically drop into their respective recesses and thereby retain the rim in its operative position, as shown.

Having thus specifically described my invention what I claim and desire by Letters Patent to secure is:

1. In combination, a steering post, a shaft rotatably arranged in said post, a collar secured to the upper end of said shaft, a pair of spokes extending radially from said collar, each of said spokes being formed in two parts pivotally united along parallel planes, the pivots for said spoke parts being arranged with their axes coinciding, a wheel rim secured to the pivotal portions of said spokes, and means for supporting said rim in its operative position relatively to said steering post.

2. A steering wheel having, in combination, a supporting collar, a pair of spokes disposed radially with respect to said collar, each of said spokes being formed in two parts pivotally united adjacent to their outer ends, the contacting faces of the pivotal portions of said spokes being arranged in substantially parallel planes, the axes of the pivots of said spokes substantially coinciding, a wheel rim secured to the pivotal section of said spokes, and a second pair of spokes secured to said rim, adapted to engage said supporting collar and detachably support said rim in its operative position with respect to said shaft.

3. A steering wheel having, in combination, a supporting collar, a plurality of spokes, two of said spokes being formed integral with said collar and in two parts pivotally united near the outer ends thereof, the axes of the pivots for said spokes coinciding, a solid rim secured to the outer ends of said spokes, and means for detachably securing the inner portions of the others of said spokes to said supporting collar to maintain said wheel rim in its operative position with respect to said steering wheel.

4. A steering wheel having, in combination, a circular integral rim, a pair of radially disposed jointed supports for said rim, the inner portions of said supports being fixed, the outer portions of said supports being secured to said rim and arranged to swing upon said inner portions about a common axis disposed adjacent to said rim and transversely of the axis of said wheel, and means for detachably securing said rim in operative relation to the fixed portions of said supports.

5. In combination, a shaft, a collar secured to said shaft, a pair of spokes disposed radially of said collar, the outer extremities of said spokes being pivotally mounted to swing about a common axis, an integral wheel rim secured to the pivotal portions of said spokes, and a second pair of spokes secured to said rim and detachably connected with said collar, adapted to support said rim in operative relation to the shaft.

In testimony whereof I have hereunto set my hand in presence of two subscribing witnesses.

ANTONIO C. SINCARE.

Witnesses:
SYDNEY E. TAFT,
HATTIE E. STRATTON.